United States Patent Office 3,061,277
Patented Oct. 30, 1962

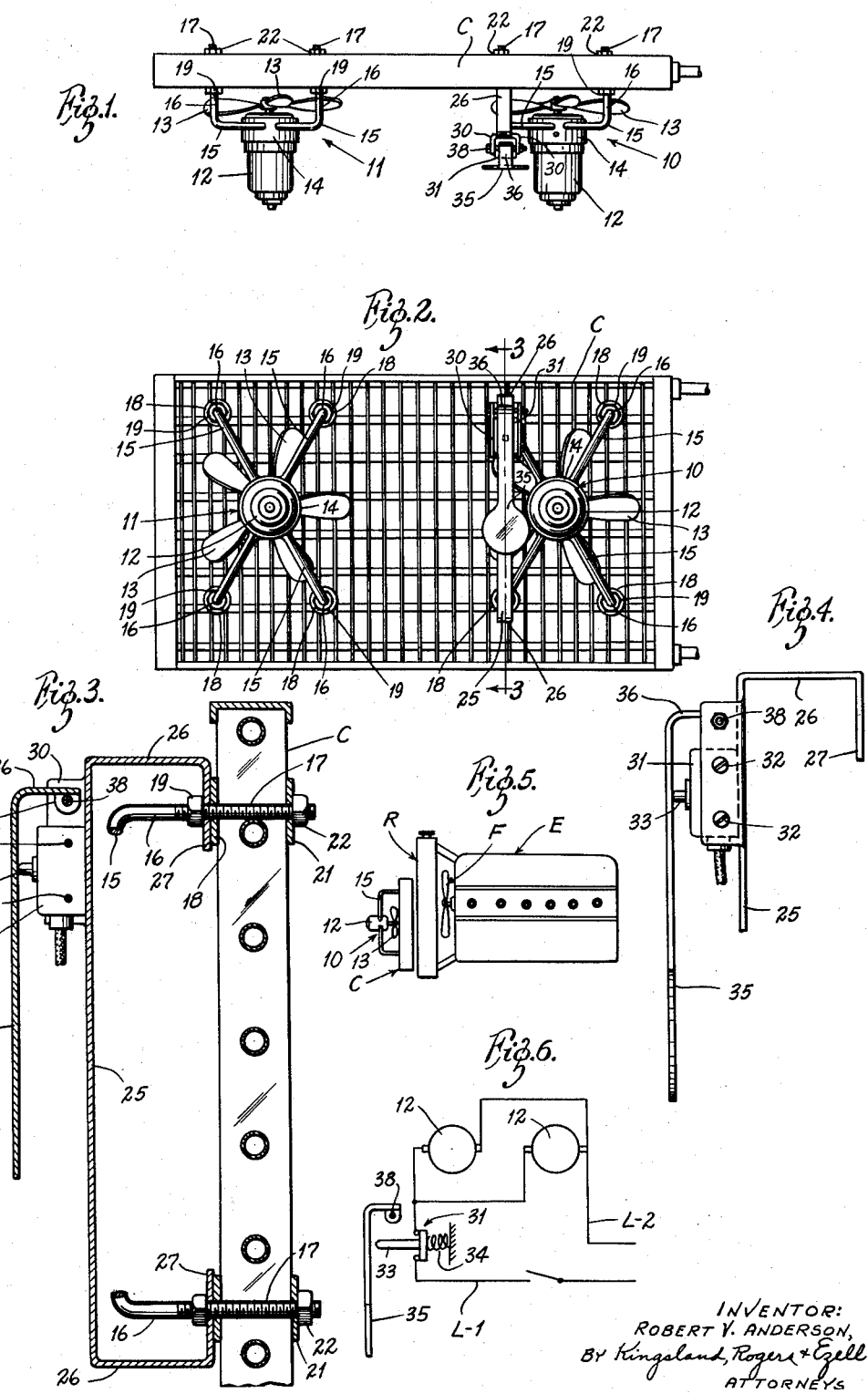

3,061,277
AIR CONDITIONER BLOWER CONTROL
Robert V. Anderson, Dallas, Tex., assignor to John E. Mitchell Company, Inc., Dallas, Tex., a corporation of Missouri
Filed Oct. 16, 1958, Ser. No. 767,730
3 Claims. (Cl. 257—314)

The present invention relates to a blower control for air conditioners and, particularly, to a blower control for use with blowers associated with condensers of automobile air conditioners.

The illustrated embodiment of this invention is used with an air conditioner condenser located just ahead of the radiator of an automobile. One or more electric motor-operated blowers are mounted in front of the condenser to force air through the condenser and the radiator. A wind-vane is disposed so as to be moved by air currents through the condenser, and it operates a switch to start the blowers when the air velocity falls below a predetermined valve. Thereby the blowers are operated to insure an adequate supply of air when the flow is otherwise too low.

The air velocity or rate of flow in cubic feet per minute is normally a function of forward movement of the vehicle and the speed of the engine fan. When the vehicle is standing idle or creeping in traffic, both the forward movement-flow and the fan-flow are low. As a result, the condenser may not adequately condense the refrigerant in the air conditioner and the radiator of the vehicle may become overheated. (Of course, if the invention is used apart from a vehicle radiator, as on a railway car, the operation does not include any vehicle radiator or fan.)

The present invention sets the blowers in operation when the normal air flow is thus reduced, and boosts the velocity enough to operate the condenser and radiator. If the driver increases the engine speed even without forward movement of the vehicle, the engine fan may then raise the air flow rate enough to make the supplemental blowers unnecessary, and they will automatically stop. Or, if the vehicle speed is increased, the air flow rate may increase enough to stop the blowers.

It is a prime object of the invention to provide a means to overcome inadequate condenser cooling on a vehicular air conditioner when the vehicle is idling or creeping, as in traffic or the like, or under service such as taxicab operation.

It is a second object of the invention to provide booster blower means for a condenser of a vehicular air conditioner that is automatically rendered operative when the rate of air flow through the condenser falls below a value adequate to cool the condenser, and to become inoperative upon restoration of air flow.

It is a further object of the invention to provide a means to cause a blower to operate to cool a vehicle heat-exchanger when the rate of air flow through the heat exchanger falls below a value adequate to operate the exchanger. Specifically, it is a main object to provide the foregoing for a heat-exchanger that is an air conditioner condenser, but it is also an object to provide the same for an automobile radiator, or for a combination of both.

It is an additional object to provide a blower means for the purposes aforesaid that is rendered operative as an inverse function of the vehicle speed and its radiator fan (or engine) speed.

Additional objects are to provide such an arrangement that requires a minimum of disturbance of the existing parts of the air conditioner or of the automobile. It is another object to provide such a control which is simple to construct, simple to operate, and inexpensive to manufacture.

Other objects will appear from the description to follows.

In the drawings:

FIGURE 1 is a plan view of a condenser with two blowers and a control in accordance with the present invention;

FIGURE 2 is a front view of the condenser and blowers of FIGURE 1;

FIGURE 3 is an enlarged vertical section through the control, taken on the line 3—3 of FIGURE 2;

FIGURE 4 is a side elevation of the control mechanism;

FIGURE 5 is a schematic view of the disposition of this control and the condenser with respect to an automobile engine, engine fan and radiator; and FIGURE 6 is a wiring diagram which may be used with the present invention.

FIGURE 5 shows an automobile engine E having a conventional water cooling radiator R and a radiator fan F. These parts are conventional. FIGURE 5 also shows a typical mounting of an air conditioner condenser C, ahead of the radiator R. The direction of travel of the vehicle, as illustrated, is from right to left, so that the condenser C is ahead of the radiator R.

FIGURES 1 through 3 also show the condenser C somewhat enlarged; and they show, associated with it, two electric motor-operated blower assemblies generally designated at 10 and 11. These are designated blowers instead of fans only as a convenience in distinguishing them from the conventional engine fan. Actually, they may be designated as either fans or blowers.

Each of these blower assemblies consists of an electric fan motor driving an appropriate blower. Since they are substantially identical, a description of one will suffice.

For example, the assembly 10 includes a motor 12 driving fan or blower blades 13. The motor is supported in a band support 14, from which a plurality of legs 15 extend more or less radially. The outer ends 16 of the arms 15 are turned backwardly and are threaded at 17. These ends are fitted through the fins or tubing of the condenser C. Large washers 18 are backed by nuts 19 threaded over the threaded ends 17, to limit the movement of the arms 15 through the condenser. The free ends of the arms project to the other side of the condenser where similar washers 21 and nuts 22 provide securing for the arm so that it is firmly held to the condenser without injuring the parts thereof. By this arrangement the fans are held on to the condenser and are properly adjusted in front of the same. The usual strap adjustment for permitting the individual fans and motors to be positioned toward or from the condenser surface without moving the arms 15 can be used.

The fans are controlled by a switch arrangement. It includes a strap or bracket 25 having its upper and lower ends 26 bent backwardly and inwardly at 27. The inturned ends 27 are drilled to fit onto the threaded ends 17 of two of the arms 15 behind the nuts 19, so that the strap 25 is thus firmly secured to the condenser. The ends 26 provide spacers to dispose the principal vertical portion of the strap back of the arms, and the fan blade 13.

The bracket 25 has, on its opposite vertical edges, one or two forwardly extending flanges 30. A Micro switch 31 is supported by bolts 32 between these two flanges 30. It has an actuator 33 on it, normally spring urged outwardly (cf. spring 34 schematically shown in FIGURE 6), to close its circuit but yieldable operable upon application of suitable inward pressure to open the circuit.

There is a sensing element in the form of an air flow-responsive vane 35. It has its upper end 36 bent horizontally and provided with opposite downturned ears 37 to receive a pivot 38 that is secured in the opposed flanges 30. By this arrangement, the sensing element 35 is located to receive air currents from ahead of the fan, that flow across the condenser C. It normally hangs by gravity against the switch actuator 33, but does not exert enough force to press the same inwardly to open the circuit.

FIGURE 6 shows a typical wiring diagram for the apparatus. Two blower motors are shown as connected in parallel. The switch 31 is normally closed so that the two motors are connected across the lines L-1 and L-2 of some power source, such as the battery of the automobile. When the switch 31 is opened, both motors are cut out of circuit.

*Operation*

As heretofore noted, the normal disposition of the present equipment is as shown in FIGURE 5 with the condenser C located in front of the conventional radiator of the automobile. Air is normally forced through the condenser by the forward movement of the vehicle and by the engine-driven radiator fan F. With this disposition of the apparatus, the sensing element 35 hangs suspended transversely to these air currents. This air movement exerts a pressure on sensing element 35 which acts through its mechanical advantage on switch 31 to open or close it, depending on velocity of air and area of sensing element 35.

When the air flow acting from left to right in the drawings is below a certain velocity, such as 8 m.p.h., the sensing element 35 hangs in the position illustrated in the drawing, the switch actuator 33 is held in its outer position, by its spring, the switch 31 is closed, and both fan motors 12 are energized, thus driving more air across the condenser and through the radiator R than would be forced over these elements with the motors inoperative. The blower itself does not have great effect on the sensing element, and may generally be ignored. Such effect as the blower has tends to reopen the switch against its spring, which is opposed by the snap-action of the switch, to keep the blower operating.

When the air-flow stream produced by vehicle movement, upon the sensing element 35 and by the vehicle fan F, reaches a certain limit, the sensing element is forced backwardly, opening the switch 31 and deenergizing the two blower motors 12 so the blowers stop operation. Typically this may occur at a car speed of 25 m.p.h. or any other speed depending on the area of the sensing element 35, the velocity of air impinging on this area; and resistance of the switch spring.

Thus the fans will operate at below 20 m.p.h. and will stop at 25 m.p.h. for a typical installation. If the vehicle is accelerated in low gear ratios, the engine fan will operate at higher speed, and render the supplemental air flow unnecessary at a lower car speed. Under such conditions the blowers will actually stop at lower car speed.

In air conditioner installations of this type, the presence of the condenser tends to decrease the cooling effect of the air on the automobile radiator. Sometimes the vehicle radiator may actually overheat, if the vehicle is operated at low speeds for long periods in hot weather. The present invention overcomes this by supplementing the air flow at low speeds, or during idling. The range of operation of the sensing element may be chosen to suit conditions.

Viewed from another approach, the present system can supplement the normal air flow across a heat exchanger, and can automatically stop that supplement when the vehicle velocity renders it unnecessary, as a function of the rate of air flow itself. In this sense, the invention can be considered as it supplements air flow through the vehicle radiator; and it differs from the engine fan cutouts that stop the fan operation in response to speed of the fan or engine.

What is claimed is:

1. An air flow control combination comprising an automobile, an automobile radiator, a radiator fan, means for moving the automobile at various speeds, means coupled to the moving means for operating said radiator fan at various speeds, a condenser forward of said radiator fan, the condenser being in the path of air flow when the automobile is moving or when the fan is operating to draw air through the condenser, blower fan means forward of said condenser, means for rotating the blower fan means, and means automatically operable in response to a predetermined combination of automobile speed and automobile fan speed for alternately energizing and deenergizing said rotating means.

2. The combination of claim 1 wherein the alternately energizing and de-energizing means comprises switch means in the circuit of said rotating means with control means responsive to the flow of air past the condenser for operating the switch means.

3. The combination of claim 2 wherein said control means operates to energize the rotating means when the rate of air flow toward the condenser is below a predetermined minimum and to deenergize the rotating means when the rate of air flow is above a predetermined maximum, the maximum being of greater magnitude than the minimum to prevent continual cycling of the control means at certain constant air speeds.

References Cited in the file of this patent

UNITED STATES PATENTS

| | | |
|---|---|---|
| 1,654,190 | Primrose | Dec. 27, 1927 |
| 1,911,522 | McIntyre | May 30, 1933 |
| 2,032,572 | Hammers et al. | Mar. 3, 1936 |
| 2,107,478 | Happel | Feb. 8, 1938 |
| 2,291,543 | Findley | July 28, 1942 |
| 2,756,026 | Myrent et al. | Sept. 24, 1956 |
| 2,826,395 | Petty | Mar. 11, 1958 |
| 2,829,869 | Philipp | Apr. 8, 1958 |